(12) United States Patent
Merchant

(10) Patent No.: US 6,532,489 B1
(45) Date of Patent: Mar. 11, 2003

(54) ELECTRONIC MAIL ALERTING SYSTEM AND METHOD WITH USER OPTIONS

(75) Inventor: Sailesh Mansinh Merchant, Orlando, FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/313,527

(22) Filed: May 17, 1999

(51) Int. Cl.⁷ .............................................. G06F 15/16
(52) U.S. Cl. ....................... 709/206; 709/200; 709/207
(58) Field of Search ................................ 709/200–203, 709/204–206, 207; 379/90, 93, 100; 455/412–414, 417, 445, 461–463; 235/375–380

(56) References Cited

U.S. PATENT DOCUMENTS

| | | | | |
|---|---|---|---|---|
| 5,473,143 A | * | 12/1995 | Vak et al. ................... | 235/380 |
| 5,742,905 A | * | 4/1998 | Pepe et al. .................. | 455/461 |
| 5,844,969 A | * | 12/1998 | Goldman et al. ............ | 455/412 |
| 5,905,777 A | * | 5/1999 | Foladare et al. ......... | 379/90.01 |
| 5,978,837 A | * | 11/1999 | Foladare et al. ............ | 709/207 |
| 6,052,709 A | * | 4/2000 | Paul ........................... | 709/202 |
| 6,067,561 A | * | 5/2000 | Dillon ........................ | 709/206 |
| 6,350,066 B1 | * | 2/2002 | Bobo, II ...................... | 709/206 |
| 6,453,341 B1 | * | 9/2002 | Miloslavsky ................ | 709/206 |

* cited by examiner

*Primary Examiner*—Bharat Barot
(74) *Attorney, Agent, or Firm*—Duane Morris, LLP

(57) ABSTRACT

An e-mail system has an e-mail server for receiving via a network e-mail messages addressed to a user of the e-mail server and system. The e-mail server receives at least one email message, and the e-mail server transmits an alerting message to a remote alerting device to alert the user of the receipt of the at least one e-mail message, wherein the remote alerting device is independent from a log-in device used by the user to log-in to the e-mail server.

15 Claims, 1 Drawing Sheet

ELECTRONIC MAIL ALERTING SYSTEM AND METHOD WITH USER OPTIONS

BACKGROUND OF THE INVENTION

1. Field of the Invention

The present invention relates to the transmission of electronic mail (e-mail) messages, and in particular, to systems and methods for alerting a recipient of receipt of e-mail messages.

2. Description of the Related Art

In computer network systems such as local-area networks ("LANs"), wide-area networks ("WANs"), and the Internet and the world-wide web ("WWW") which operates thereon, e-mail systems and associated protocols are often utilized to facilitate communication between two users of the network or e-mail system. Each user has a unique network address which may be used for routing and identifying purposes in delivering an e-mail message from one user (the "sender") to another user (the "recipient") on the network. The email address for both senders and recipients of e-mail messages is typically of the form NAME@DOMAIN.EXT, where the "name" is a unique character string for the top-level domain, "domain.ext" is the domain name, and "ext" is the extension or top-level portion of the domain name, such as "com" or "org".

E-mail messages are typically sent from a sender to a recipient by the sender typing or otherwise preparing an e-mail message on a PC (personal computer), which is itself typically coupled to a server coupled to a communications network such as the Internet. The e-mail contains both a body or content portion, which contains the message itself, and, inter alia, the network e-mail address(es) of the recipient(s). E-mail messages can also include more complex information such as attached files. In general, however, each e-mail transmission from a sender to a recipient over a network includes some body or message portion and the network addresses of the sender and recipient. The e-mail transmission may be referred to, in general, as an e-mail message, which is transmitted via a network from a sender to a recipient.

The e-mail message is thus transmitted from the sender PC to the local network router or server, which delivers the e-mail message in packetized form to the network. The packets are each routed from one node of the network to another, in accordance with the recipient address information associated with the packets. These packets are received by a recipient server of the network, which can then assemble the received packets into the original e-mail message and deliver the e-mail message to the recipient's PC, which is attached to the recipient server.

For many users, the send and receive e-mail server functions are performed by a service provider such as an Internet service provider (ISP). In order to receive e-mail, a user must first "log in" to his ISP, typically by use of a modem and telephone line or other communications channel such as a cable system cable. Any e-mail messages which have been received by the ISP for the user since the last time the user logged in to his ISP may then be delivered to the user-recipient. If the user keeps his PC continually logged on to his ISP and is present at his PC, he can receive e-mail as soon as it is received by his ISP. The user's own PC may be configured to alert the user when it receives the e-mail message from the ISP. However, many users log in only periodically to check for e-mail messages. Thus, if an important e-mail message arrives while the user is not logged in or is away from his PC terminal (for example, on vacation or traveling overseas or in remote areas), the user will not be aware of this.

SUMMARY

An e-mail system has an e-mail server for receiving via a network e-mail messages addressed to a user of the e-mail server and system. The e-mail server receives at least one e-mail message, and the e-mail server transmits an alerting message to a remote alerting device to alert the user of the receipt of the at least one e-mail message, wherein the remote alerting device is independent from a log-in device used by the user to log-in to the e-mail server.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
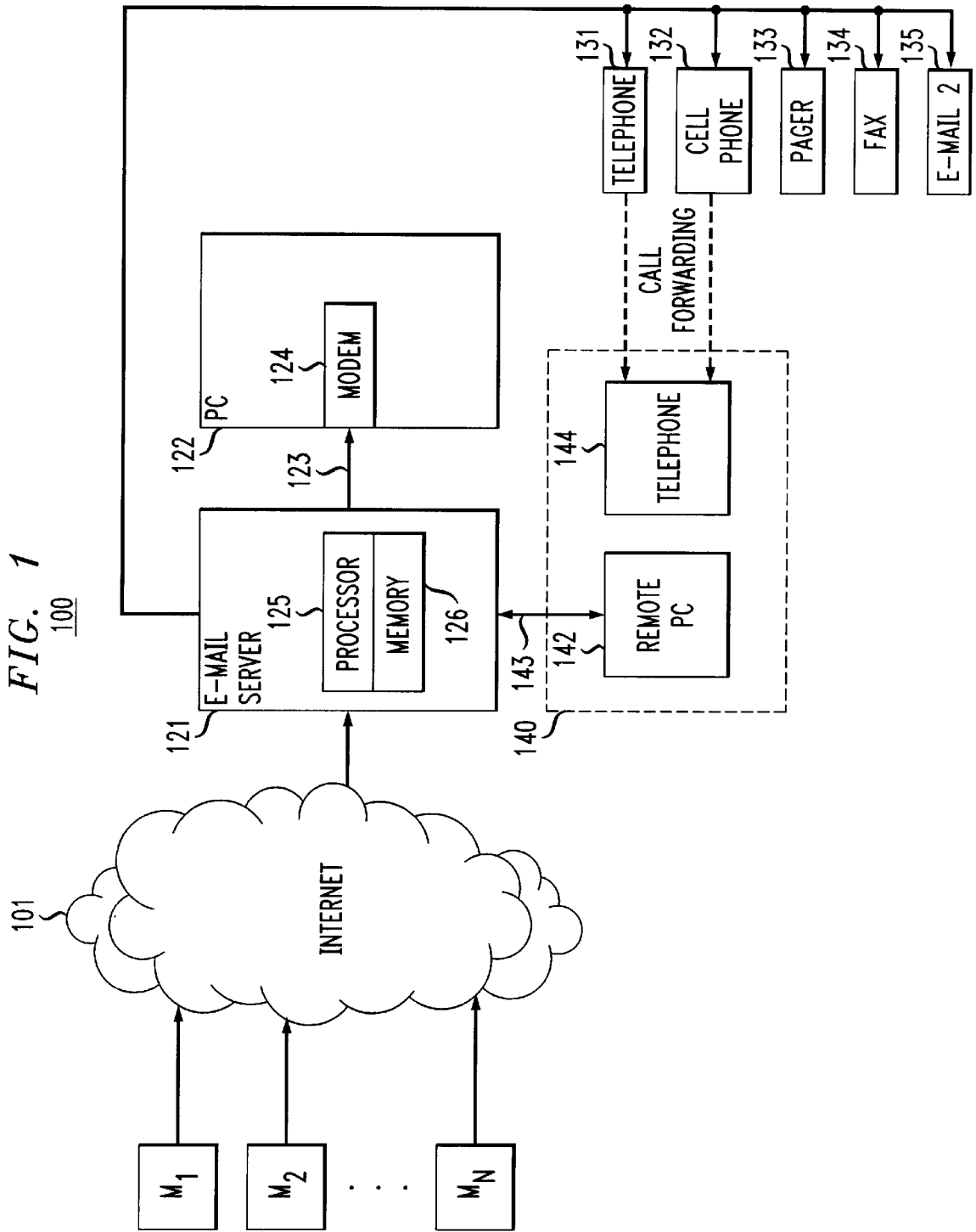
FIG. 1 shows a networked e-mail system in accordance with a preferred embodiment of the present invention.

In the present invention, there is provided a flexible and configurable e-mail alerting system and method for ensuring that an e-mail system user is notified of the receipt of important e-mail messages by his ISP's e-mail server, even if the user is not currently logged in to the ISP. In one embodiment, the e-mail server is programmed to automatically alert the user of received e-mail messages, when the user is not logged in to the e-mail server of the ISP, via preselected remote alerting means such as a page to a pager or pre-recorded alerting message delivered to a telephone number of a telephone or cell phone. The alerting means are "remote" in the sense that they are independent of the log-in device (PC 122), i.e. the remote alerting means can receive messages of a certain type but cannot be used to log in. This and alternative embodiments are described in further detail below.

Referring now to FIG. 1, there is shown a networked e-mail system 100 in accordance with a preferred embodiment of the present invention. E-mail system 100 comprises e-mail server 121, PC 122, and various alerting means such as telephone 131, cell phone 132, pager 133, fax 134, and alternate e-mail address 135. The user's PC 122 may be selectively coupled via a telephone line 123 and modem 124 to e-mail server 121, when the user is logged in to the e-mail server via pC 122. E-mail server 121 is typically provided by an ISP to which the user subscribes. E-mail server 121 is coupled to a network such as Internet 101, which can route email messages such as messages $M_1$, $M_2$, ..., $M_N$ from various e-mail message senders, to email server 121 for delivery to the recipient-user of PC 122. E-mail server 121 can also route e-mail messages from the user to specified recipients via Internet 101. In an alternative embodiment, the e-mail server may be a device used to receive and store e-mail messages, which may be co-located with or contained in user's PC 122. Such an e-mail server may, for example, by always coupled to Internet 101 via an open data channel.

In an embodiment of the present invention, e-mail server 121 knows at any given moment whether or not PC 122 is logged in to e-mail server 121, and is configured to automatically alert the user of PC 122 of the receipt by e-mail server 121 of any e-mail message addressed to the user, by way of a pre-selected alerting means. This alerting is done only when PC 122 is not logged in to e-mail server 121, on the assumption that PC 122 will adequately alert the user of received e-mail if the user is logged in. In this embodiment, the user supplies e-mail server 121 at some previous time, e.g. during an initial set up or just before a recent log-off, with connection information for at least one alerting means, such as the telephone number of land-line telephone 131, the telephone number of cell phone 132, the telephone number of pager 133, the telephone number of fax 134, and/or the user's secondary e-mail address 135. Related information may also be provided as part of the connection information, such as the type of alerting device, pager codes. Priority information may also be provided to allow e-mail server 121 to determine which alerting means to try first or most frequently, and so forth. The alerting means connection information may be stored in memory 126 of e-mail server 121. Processor 125 is used to implement various instructions, programs, e-mail handling routines, and the like.

Thus, when e-mail server 121 receives an e-mail message such as one of e-mail messages $M_1, M_2, \ldots, M_N$, which is addressed to the user, then the e-mail server 121 checks to see if the user's account is currently active, i.e. whether the user is currently logged in to the ISP via any connection means such as PC 122 and telephone line 123. If the user is not logged in, then e-mail server 121 checks memory 126 to see if there is any alerting means connection information previously specified by the user. If so, then e-mail server 121 automatically sends a short alerting message via one or more of these alerting means to the user to alert the user that he has received at least one e-mail message.

The alerting message may be a simple message such as, "You have received e-mail", and is provided in a format compatible with nature of the particular alerting means. For example, an alerting message sent to telephone 131 or cell phone 132 is transmitted as a voice message, from a voice synthesizer which converts the text "You have received e-mail" into corresponding audible words. The text alerting message is transmitted as is for pager 123, and in fax format to fax 134, for example. The alerting message may also contain additional information, such as the time of receipt of the last e-mail message, the number of e-mail messages received since the user has been logged off, the e-mail address or handle or the sender, the subject or keyword of the e-mail message(s) received, and similar information. In this manner, a user who is away from PC 122 and not logged in to e-mail server 121 can receive via one of the alerting means 131–135 notification that e-mail server 121 has received e-mail messages for the user since the most recent log-in.

In one embodiment, e-mail server 121 instantly sends such an alerting message, to all specified alerting means simultaneously. In another embodiment, the e-mail server 121 transmits an alerting message first to the highest priority alerting means, and then to lower priority alerting means until the user logs in, preferably in accordance with priority information specified by the user as part of the previously-provided alerting means connection information.

In another embodiment, e-mail server 121 alerts the user of e-mail messages received, whether or not the user is logged in, in case, for example, the user is logged in via PC 122 but is away from PC 122.

In another embodiment, e-mail server 121 does not alert the logged off user of every received e-mail message, but only of e-mail messages received that match some specified "importance" criteria or profile, such as e-mail messages received with a specified subject line, sender address, or sender handle. The user may specify, for example, as part of the alerting means connection information, a list of e-mail addresses or handles that signify "important" email message senders. Whenever one of these e-mail messages is received, the user is alerted of receipt of an e-mail message.

In another embodiment, the alerting feature may be configured to provide various options to the user who receives the alerting message. For example, when an alerting message is transmitted to cell phone 132 or land line phone 131, the alerting message may be left as a voicemail with the phone if the user does not answer. If the user answers, however, the e-mail server can inform the user of received e-mail, and can also offer to the user the option, for example, to "read" to the user all or preselected ones of the received e-mail messages. Alternatively, if a user is notified by pager 133 of received e-mail, the user may dial in to e-mail server 121 via a telephone and have e-mail server 121 read selected e-mail messages to him. Such embodiments may be useful in assisting visually handicapped persons to access e-mail messages. Similarly, TTY (teletype) or other devices used to assist hearing-impaired persons, may be employed to allow such persons to "read" received e-mail messages.

In another embodiment, various alerting means such as telephone 131 and cell phone 132 may be configured to forward calls to any specified telephone 144 at a remote location 140. Thus, when the user is at remote location 140 where none of alerting means 131–135 is available, if the alerting message received by an alerting means is forwarded to phone 144 at the remote location 140, the user may utilize a remote PC 142 such as a lap top PC to log in to e-mail server 121 to check e-mail messages, via any available communications channel 143, such as a cell phone or satellite link available from remote location 140.

In an alternative embodiment, when the user is logged off and e-mail server 121 receives an e-mail message from a given sender, e-mail server 121 only sends an alerting message to the user if permission is first received from the sender. Thus, e-mail server 121 transmits an alerting-permission e-mail message back to the sender of the received e-mail message, informing the sender that the recipient is currently logged off, and asking whether the e-mail message is important enough to require an alerting message to be sent to the recipient-user. The sender may simply reply to the e-mail message (which may be sent back to the e-mail server 121 at a special server address), with a "yes" to cause e-mail server 121 to begin the alerting process. Alternatively, the alerting-permission e-mail message may provide the sender with various options to configure or modify the alerting message and means to be used. For example, the alerting-permission e-mail message may ask the sender to provide an urgency rating (extremely urgent, moderately urgent, etc.), and may offer the sender the ability to type a short summary of the e-mail message, e.g. 100 words or less, which may be included in the alerting message. Such short summaries provided upon request by the sender may be useful when the alerting message is received by the user-recipient in a voicemail alerting message left on cell phone 132 or telephone 131, via fax 134, or on pager 133, for example.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

In an alternative embodiment, one or more of alerting means or devices 131–135 may not be directly accessible to the user but accessible to another person such as an assistant of the user. For example, the user's secretary may have pager 133, which receives the alerting message. The purpose of the alerting message is still to alert the user, ultimately, of the receipt of the e-mail message, but this is done by first alerting the user's assistant of the receipt of the e-mail message, who can then in turn alert the user.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In an e-mail server for receiving via a network e-mail messages addressed to a user of the e-mail server, a method comprising the steps of:

(a) receiving with the e-mail server at least one e-mail message from a sender; and (b) transmitting an alerting message to a remote alerting means to alert the user of the receipt of the e-mail message, wherein:

the remote alerting means is independent from a log-in means used by the user to log-in to the e-mail server; and the e-mail server includes an option to transcribe said e-mail message via an alerting means.

2. The method of claim 1, wherein step (b) comprises the step of transmitting the alerting message only if the user is not logged in to the e-mail server.

3. The method of claim 1, wherein step (b) comprises the step of transmitting the alerting message only if the e-mail message matches importance criteria.

4. The method of claim 3, wherein the importance criteria comprise a list of e-mail message senders, whereby step (b) comprises the step of transmitting the alerting message only if the sender is on the list.

5. The method of claim 4, further comprising the step of:

(c) providing, with the user, alerting means connection information comprising the importance criteria to the e-mail server before steps (a) and (b).

6. The method of claim 1, further comprising the step of:

(c) providing, with the user, alerting means connection information to the e-mail server before steps (a) and (b), wherein step (b) comprises the step of:

(b) transmitting the alerting message in accordance with the alerting means connection information.

7. The method of claim 6, wherein the alerting means comprise at least one of a land-line based telephone, a cell phone, a fax machine, and a pager.

8. The method of claim 1, wherein the connection information comprises connection information for each said alerting means and priority information specifying respective alerting priorities for said connection means, wherein the alerting message is transmitted earlier and more often to higher priority alerting means.

9. The method of claim 1, wherein the alerting message comprises information identifying the sender of the e-mail message.

10. The method of claim 1, further comprising the step of:

(c) receiving the alerting message with a telephone type alerting means; and (d) forwarding the alerting message from the telephone type alerting means to a second telephone.

11. In an e-mail server for receiving via a network e-mail messages addressed to a user of the e-mail server, a method comprising the steps of:

(a) receiving with the e-mail server at least one e-mail message from a sender; and (b) transmitting an alerting message to a remote alerting means to alert the user of the receipt of the e-mail message only if permission has been received from the sender, wherein:

the remote alerting means is independent from a log-in means used by the user to log-in to the e-mail server; and the e-mail server includes an option to transcribe said e-mail message via an alerting means.

12. The method of claim 11, wherein step (b) comprises the steps of:

(i) transmitting an alerting-permission e-mail message to the sender to notify the sender that the recipient is currently logged off and providing an alerting message option to the sender;

(ii) receiving a reply message from the sender; and (iii) transmitting the alerting message only if the reply message grants permission to do so.

13. The method of claim 12, wherein the alerting-permission e-mail message offers one or more alerting message options to the sender, and the alerting message is transmitted in accordance with corresponding alerting message option information transmitted to the e-mail serve in the reply message.

14. An e-mail server for receiving via a network e-mail messages addressed to a user of the e-mail server, the e-mail server comprising:

(a) means for receiving at least one e-mail message from a sender; and (b) means for transmitting an alerting message to a remote alerting means to alert the user of the receipt of the e-mail message, wherein the remote alerting means is independent from a log-in means used by the user to log-in to the e-mail server, wherein the e-mail server offers to the user via an alerting means an option to transcribe said e-mail message via said alerting means.

15. An e-mail system for providing e-mail communications to a user of the e-mail system, the e-mail system comprising:

(a) an e-mail server; and (b) at least one remote alerting device independent from a log-in device used by the user to log-in to the e-mail server, wherein:

the e-mail server receives from a sender via a network at least one e-mail message addressed to the user;

the e-mail server transmits an alerting message to the remote alerting device to alert the user of the receipt of the e-mail message;

the remote alerting device receives the alerting message; and the e-mail server offers to the user via an alerting means an option to transcribe said e-mail message via said alerting means.

* * * * *